United States Patent
Forrester et al.

(10) Patent No.: US 10,521,398 B1
(45) Date of Patent: Dec. 31, 2019

(54) TRACKING VERSION FAMILIES IN A FILE SYSTEM

(71) Applicant: EMC IP Holding Company LLC, Hopkinton, MA (US)

(72) Inventors: Walter C. Forrester, Berkeley Heights, NJ (US); Ivan Bassov, Brookline, MA (US); Michal Marko, Fanwood, NJ (US); Ahsan Rashid, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 654 days.

(21) Appl. No.: 15/197,055

(22) Filed: Jun. 29, 2016

(51) Int. Cl.
- *G06F 16/16* (2019.01)
- *G06F 16/13* (2019.01)
- *G06F 16/23* (2019.01)

(52) U.S. Cl.
CPC .......... *G06F 16/162* (2019.01); *G06F 16/137* (2019.01); *G06F 16/2329* (2019.01)

(58) Field of Classification Search
CPC ........ G06F 17/30117; G06F 17/30097; G06F 17/30356; G06F 16/162; G06F 16/137; G06F 16/2329
USPC ...................................................... 707/692
See application file for complete search history.

(56) References Cited

U.S. PATENT DOCUMENTS

| | | | | |
|---|---|---|---|---|
| 7,555,504 | B2 * | 6/2009 | Bixby | G06F 17/30088 |
| 8,706,833 | B1 * | 4/2014 | Bergant | G06F 17/30215 |
| | | | | 709/214 |
| 9,330,155 | B1 * | 5/2016 | Bono | G06F 16/184 |
| 9,696,906 | B1 * | 7/2017 | Bassov | G06F 3/0604 |
| 9,778,996 | B1 * | 10/2017 | Bono | G06F 16/128 |
| 9,846,544 | B1 * | 12/2017 | Bassov | G06F 3/0617 |
| 9,864,753 | B1 * | 1/2018 | Armangau | G06F 16/1727 |
| 9,916,102 | B1 * | 3/2018 | Bassov | G06F 3/065 |
| 2005/0065986 | A1 * | 3/2005 | Bixby | G06F 17/30088 |
| 2005/0246382 | A1 * | 11/2005 | Edwards | G06F 3/061 |
| 2012/0066183 | A1 * | 3/2012 | Adkins | G06F 17/30088 |
| | | | | 707/649 |
| 2015/0106335 | A1 * | 4/2015 | Hunt | G06F 17/30088 |
| | | | | 707/639 |

OTHER PUBLICATIONS

"EMC CLARiiON Reserved LUN Pool Configuration Considerations; Best Practices Planning", Sep. 2010, 23 pages.

* cited by examiner

*Primary Examiner* — James Trujillo
*Assistant Examiner* — Jessica N Le
(74) *Attorney, Agent, or Firm* — BainwoodHuang

(57) ABSTRACT

A technique for facilitating file system operations in a data storage system provides multiple version family databases. Each version family database identifies members of a respective version family, i.e., a respective set of files in a file system that are related by file snapping. When a snap of a file is created, the file system updates a version family database for the version family that includes the file, such that the version family database identifies both the file and the snap.

15 Claims, 9 Drawing Sheets

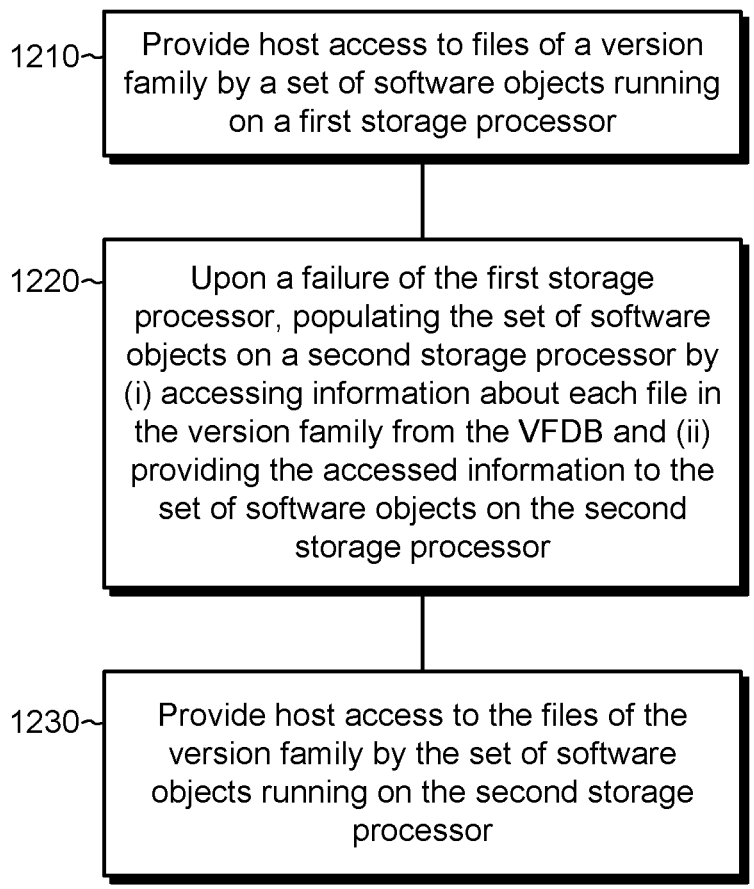
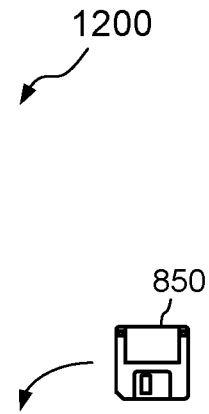
FIG. 12
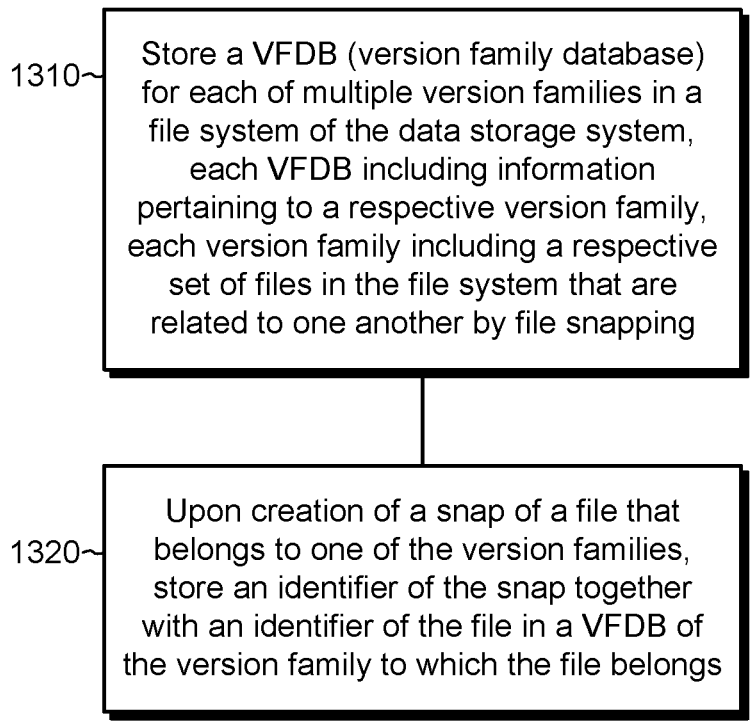
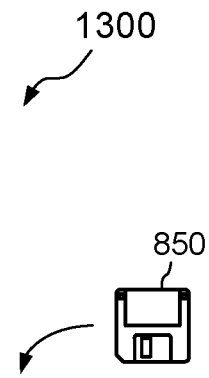
FIG. 13

TRACKING VERSION FAMILIES IN A FILE SYSTEM

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly store data objects, such as LUNs (Logical UNits), file systems, virtual machine disks, and/or other types of objects, which the data storage systems make accessible to hosts for reading and/or writing. In one arrangement, a data storage system implements data objects as files that are stored within internal file systems. In an example, each internal file system stores one file that implements a production version of a data object and other files that implement snaps (point-in-time versions) of that data object. The data storage system may provide multiple internal file systems to support multiple production objects and their respective snaps.

SUMMARY

Sometimes, it is desirable to store multiple production objects and their respective snaps together in a single file system. Unfortunately, however, doing so can make file system operations much less efficient, as sharing relationships among files in the file system based on file snapping cannot be assumed. Rather, each file in the file system may share data with only a small percentage of other files in the file system. Thus, for example, when searching for files in the file system that share data at a particular file location, it may be necessary to check every file in the file system for potential sharing at that location, even though only a small percentage of those files are likely to be candidates. File system efficiency can thus become severely degraded.

In contrast with the prior approach, an improved technique for facilitating file system operations in a data storage system provides multiple version family databases. Each version family database identifies members of a respective version family, i.e., a respective set of files in a file system that are related by file snapping. When a snap of a file is created, the file system updates a version family database for the version family that includes the file, such that the version family database identifies both the file and the snap.

Advantageously, version family databases provide structures that a file system may access to identify, easily and efficiently, only those files that are related by file snapping and thus only those files that are candidates for data sharing at corresponding file locations. Such databases thereby allow file system operations to proceed efficiently, even if a file system includes many production data objects and their respective snaps.

The use of version family databases is not limited to internal file systems of data storage systems. Rather, such databases may be used in any file systems that support multiple version families.

Certain embodiments are directed to a method of facilitating file system operations in a data storage system. The method includes storing a VFDB (version family database) for each of multiple version families in a file system of the data storage system, each VFDB including information pertaining to a respective version family, each version family including a respective set of files in the file system that are related to one another by file snapping. The method further includes, upon creation of a snap of a file that belongs to one of the version families, storing an identifier of the snap together with an identifier of the file in a VFDB of the version family to which the file belongs.

Other embodiments are directed to a data storage system constructed and arranged to perform a method of facilitating file system operations in a data storage system, such as the method described above. Still other embodiments are directed to a computer program product. The computer program product stores instructions which, when executed on control circuitry of a data storage system, cause the data storage system to perform a method of facilitating file system operations in a data storage system, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

FIG. 12 is a flowchart showing an example method of performing a fast failover operation from a first storage processor to a second storage processor using a VFDB; and FIG. 13 is a flowchart showing an example method of facilitating file system operations in a data storage system.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for facilitating file system operations in a data storage system provides multiple version family databases, wherein each version family database identifies members of a respective version family, i.e., a respective set of files in a file system that are related by file snapping. When a snap of a file is created, the file system updates a version family database for the version family that includes the file, such that the version family database identifies both the file and the snap.

This specification is provided in the following sections to assist the reader:

Section I is directed to an example environment and data storage system in which a file system includes multiple version families; and Section II is directed to particular improvements, which may be carried out in the example environment of Section I, for tracking version families in a file system.

Section I: Example Environment

Some data storage systems employ a liability/insurance model to track available storage space. For example, when a file system built upon a pool of storage resources initiates an action that would change the amount of storage space required from the pool, the file system calculates a "liability." The liability identifies an estimate of the amount of storage space required from the pool to complete the action. If the storage pool has enough available storage space to cover the liability, then the pool may issue "insurance" against the liability, e.g., by increasing the amount of reserved space in the pool by the specified amount of liability. The file system may then proceed to perform the initiated action, as the storage space required to complete the action has been fully insured.

As described in this section, a novel technique for managing storage space in a data storage system generates liability values on a per-family basis, with each "family" including files in the file system that are related to one another by snapping. Each family thus groups together files in the file system that potentially share at least some blocks among one another based on snapshot activities. Distinct files that do not share blocks based on snapping are provided in separate families. The file system thus leverages the snap-based relationships among family members to produce more accurate estimates of liability than would otherwise be feasible.

Figure 1:
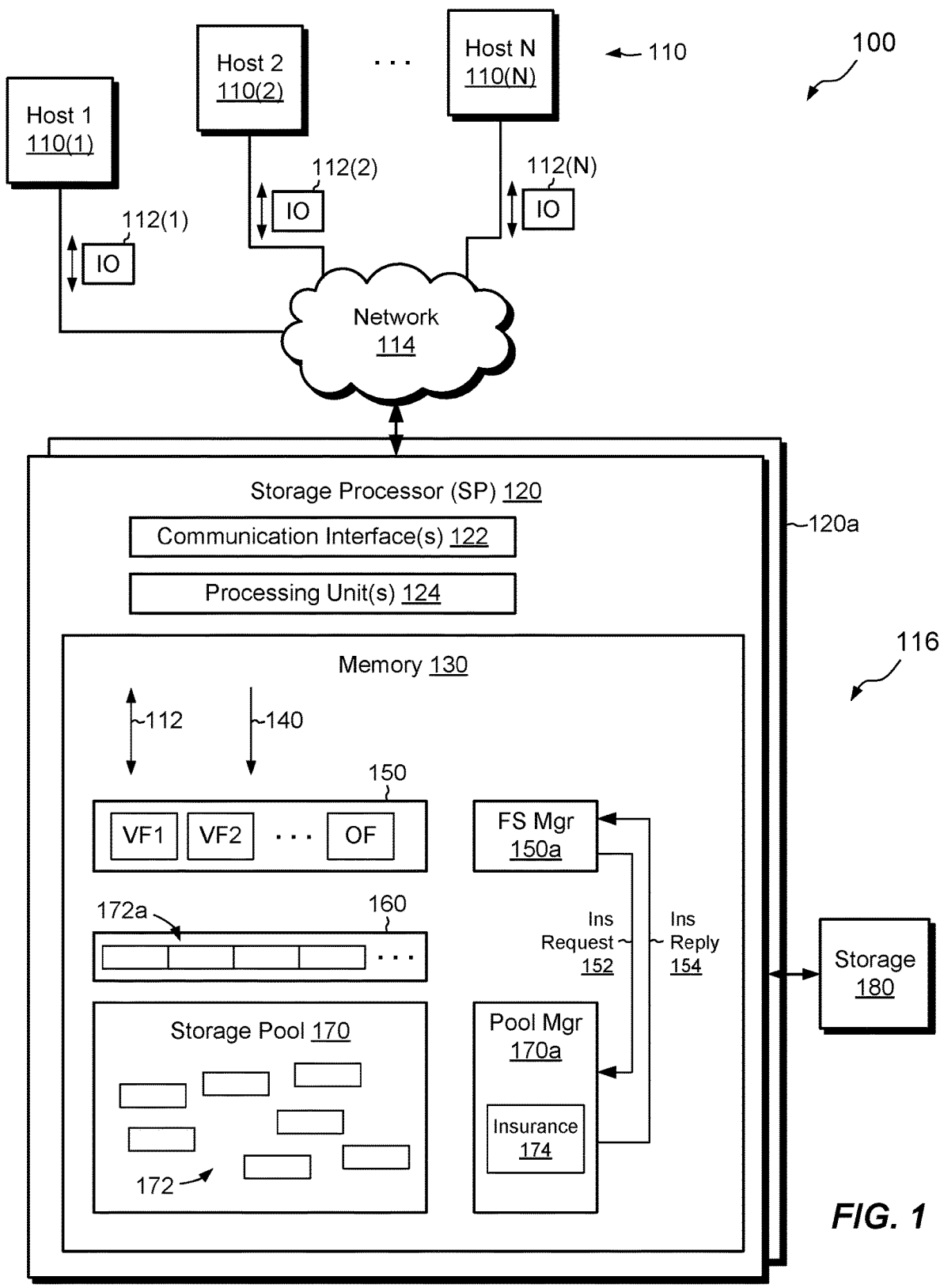
FIG. 1 is a block diagram of an example environment in which embodiments of the improved technique hereof can be practiced.

FIG. 1 shows an example environment 100 in which embodiments of the improved technique hereof can be practiced. Here, multiple host computing devices 110 ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

In an example, the storage 180 includes multiple disk drives, such as magnetic disk drives, electronic flash drives, solid state drives, optical drives, and/or other types of drives. Such disk drives may be arranged in RAID (Redundant Array of Independent/Inexpensive Disks) groups, for example, or any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a file system 150, a file system manager 150a, a sparse volume 160, a storage pool 170, and a pool manager 170a. The file system manager 150a manages operations of the file system 150 and the pool manager 170a manages operations of the storage pool 170a. Although a single file system 150 is shown, the data storage system 116 may include multiple file systems all sharing the same storage pool 170. Also, the data storage system 116 may include multiple storage pools, with each pool supporting its own respective file systems. The example shown is simplified and intended to be merely illustrative.

The storage pool 170 consumes the storage 180 (e.g., disk drives, solid state drives, etc.) and renders portions thereof in the form of extents 172. In a non-limiting example, extents 172 are fixed-size increments of storage, such as 256 MB or 1 GB in size, which provide storage units that may be provisioned within the data storage system 116.

The pool manager 170a manages the provisioning of extents 172 from the pool 170 and performs accounting to manage insurance 174. For example, pool manager 170a maintains a balance of reservations on storage extents 172 needed to cover all liability of any and all consumers of the storage pool 170, to ensure that space guarantees are maintained. In an example, the pool manager 170a requires total insurance 174 always to meet or exceed total liability.

The file system 150 is built upon the sparse volume 160. In an example, each file system in the data storage system 116 has its own respective sparse volume. Provisioned extents 172a have been provisioned from the storage pool 170 to satisfy storage requirements of file system 150. As the file system 150 grows and requires additional storage space, the file system 150 requests one or more additional extents 172 from the storage pool 170. Not all data objects in the file system 150 are necessarily fully space-guaranteed. Thus, there may be times when the file system 150 requests extents 172 for non-guaranteed objects but none are available without violating existing space guarantees.

As further shown in FIG. 1, the file system 150 includes multiple version families, VF1, VF2, etc., as well as an overhead family, OF. Each version family includes one or more files, which, where multiple files are provided, relate to one another by snapping. In some examples, one file in a version family may be a production file and the other files in that version family may be snaps (point-in-time versions) of that production file. In other examples, a version family may include multiple production files that each may have initially been snaps of some original file, which may or may not still be present. As the files in each version family are related by snapping, each of the files in a version family generally has block-sharing relationships with each of the other files in that version family. For example, each file in a version family typically shares at least one block (and often many blocks) with each of the other files in that version family. Version families generally do not share blocks with one another, however. Thus, a file in one version family has no block-sharing relationship with a file in any another version family.

In an example, the files within each version family provide file-based realizations of host-accessible data objects, such as LUNs, files systems, VVols, and/or other types of virtual machine disks, for example. Mapping (not shown) within the memory 130 translates the data in these files to corresponding data objects, which are then made accessible to hosts 110.

As is known, 'snapping' is a process whereby a file system creates a point-in-time version (snap) of a file by allocating a new inode (file-specific metadata structure) for the snap and copying attributes from the file's inode to the snap's inode. The copied attributes include one or more pointers to an indirect block tree of the file, which points to and arranges data blocks that store file data of the file. Creating a snap therefore allocates new metadata (the new inode) but no new data blocks. Rather, all data blocks of the file are initially shared with the snap. Over time, as the file evolves, write splits occur in which new data blocks are allocated to the file at written-to locations. The file's indirect block tree is updated to point to the newly-allocated blocks, with new indirect blocks allocated as needed. However, the snap's data blocks and indirect block tree remain unchanged. A consequence of a write split is that a data block of the file, which was previously shared with a snap, becomes "unique" (unshared). The block may become shared again later when another snap is taken, but such sharing will be between the file and the new snap, not with the previous snap. It should be appreciated that snaps may be generated in numerous ways, and that the particular manner described above is intended merely to be illustrative. Also, snaps are sometimes referred to by different names, such as "snapshots," "clones," and the like. The descriptions herein pertaining to "snaps" are also intended to apply to similar structures referred to by different names.

Unlike the version families (e.g., VF1, VF2, etc.), the overhead family, OF, typically does not include files or snaps but rather metadata structures that are common to many or all version families. These may include, for example, inodes, per-block metadata, virtual block maps, metadata of the sparse volume 160, and/or other structures. The file system 150 may store many of these structures per metadata block, such that any one block may include metadata that applies to multiple version families. In alternative embodiments, metadata applying to different version families may be stored in respective sets of blocks, such that these sets of blocks may be included in the version families rather than in a separate overhead family.

In example operation, hosts 110(1-N) issue IO requests 112(1-N) to the data storage system 116. The SP 120 receives the IO requests 112(1-N) at the communication interfaces 122 and initiates further processing. Such processing may include, for example, performing reads and writes to files in version families of the file system 150.

At some point, the file system 150 receives a command 140 to perform an action that would affect storage requirements of one or more files in a version family. In various examples, the action specified by the command 140 may be to create or delete a data object in a version family, to create or delete a snap, or to convert a file in a version family from thin to thick, or vice versa. In some examples, the command 140 originates from outside the data storage system 116, e.g., from a host 110 or an administrative computer (not shown). In other examples, the command 140 originates from within the data storage system 116, e.g., from another software construct running on the SP 120, or even from within the file system manager 150a itself, e.g., in response to the file system 150 requiring one or more additional storage extents 172 or being able to return one or more provisioned storage extents 172a to the storage pool 170.

As is known, a "thick" file is a file that has a predetermined maximum size that is fully reserved. For example, the pool manager 170a may provide 10 GB of insurance 174 to support a 10 GB thick file, even if the file only uses a fraction of that space. In contrast, a "thin" file is not fully reserved. Rather, reserved space for a thin file grows in response to the file being written-to, e.g., on demand in response to IO requests 112 from hosts 110. In an example, the file system 150 includes metadata that identifies a file as being either thin or thick, e.g., using an attribute of an inode of the file. Based on the setting of that attribute, the file system manager 150a treats the file accordingly, e.g., by fully reserving space to accommodate a maximum predetermined size of the file if the file is designated as thick, and by not fully reserving such space if the file is designated as thin.

In response to receiving the command 140 that would affect storage requirements of a version family, the file system 150 generates a family liability value. The family liability value provides an estimate of storage space that would be required for that version family if the action were performed. For example, if the action specified by command 140 is to create a new thick object, the new object would require additional liability at least as large as the maximum predetermined size of that thick object.

In some examples, generating family liability involves determining space requirements for both file data and certain metadata (e.g., indirect blocks) specific to the version family. In further examples, overhead liability is also determined at this time, to account for metadata not specific to the particular version family but necessary to fully support the specified action.

Once family liability is generated (e.g., for data, for metadata, for both, and/or for the overhead family), the file system manager 150a sends an insurance request 152 to the pool manager 170a specifying the generated liability value or values. The pool manager 170a then checks for available space in the storage pool 170, accounting for existing reservations indicated by insurance 174. The pool manager 170a then issues an insurance reply 154. If the pool 170 has available storage space greater than or equal to the requested liability value(s), the insurance reply 154 grants the insurance request 152. The action specified by command 140 may then proceed. However, if the pool 170 does not have enough available storage to meet the request 152, the insurance request 152 is denied and the action specified by the command 140 does not proceed.

Data storage system 116 may generate new family liability values in response to newly arriving commands and may provide different family liability values for different families. Liability values are thus generated on a per-family basis. As will be described, generating liability in this way leverages relationships among family members and avoids greatly overestimating liability requirements in the file system 150.

Figure 2:
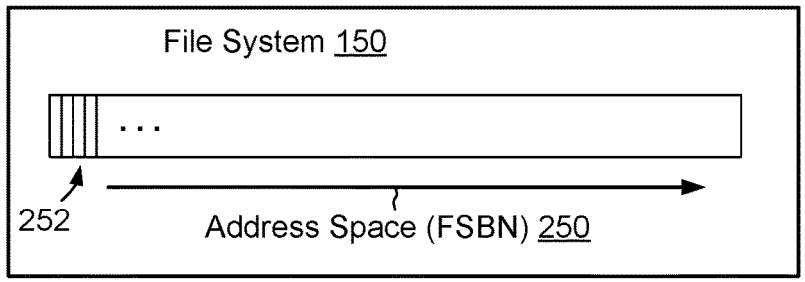
FIG. 2 is a block diagram of an example file system of FIG. 1.

FIG. 2 shows an example arrangement of file system 150 in additional detail. Here, it is seen that file system 150 has an address space 250, which ranges, for example, from zero to a large number. Each address in the address space 250 has an FSBN (File System Block Number) that uniquely identifies a respective block (see blocks 252). Some blocks 252 store file data while others store metadata. Some blocks 252 are shared among multiple files, whereas others are unique to a single file. Still other blocks 252 may be free, i.e., present within the address space 250 but not yet allocated to anything. Metadata stored in blocks within the file system address space 250 provides structure that defines files and version families in the file system 150.

Figure 3:
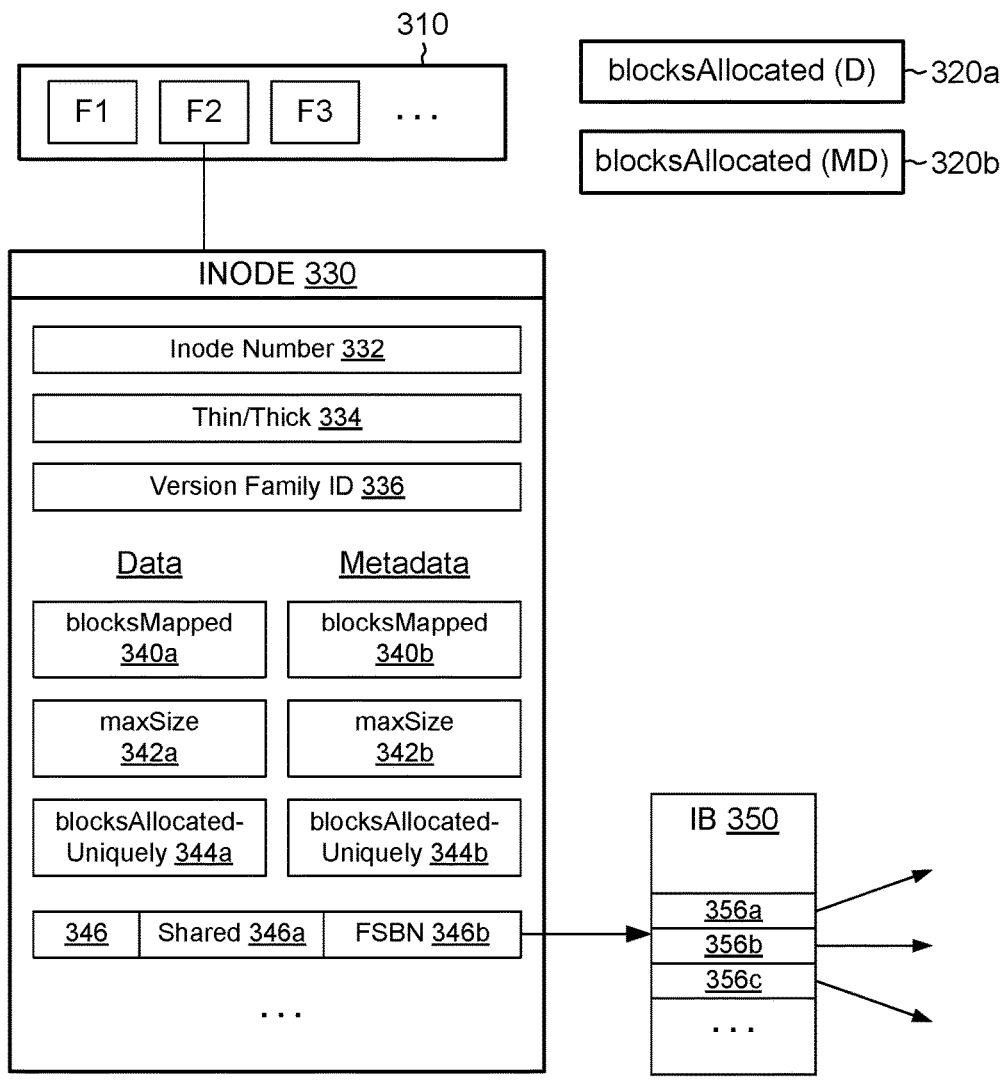
FIG. 3 is a block diagram of an example version family of FIG. 1, including example metadata structures.

FIG. 3 shows example metadata structures of file system 150. In an example, such metadata structures track information relevant to generating accurate family liability estimates.

As shown in FIG. 3, version family 310 includes multiple files, F1, F2, F3, and so on. Each file has an associated inode (index node), with inode 330 of file F2 shown in detail. Although the inode 330 relates particularly to file F2, it is intended to be representative of inodes of files in any version family.

Inode 330 stores attributes specific to the file F2, only some of which are shown. For example, inode number 332 uniquely identifies file F2 within the file system 150. Also, thin/thick attribute 334 specifies whether the file F2 is thin or thick, and version family identifier 336 provides an identifier of the version family to which the file F2 belongs (e.g., version family 310). Some inode attributes are provided for both data and metadata (e.g., indirect blocks) of file F2, as described in the following table:

TABLE 1

| Term | Meaning for Data | Meaning for Metadata |
|---|---|---|
| blocksMapped | 340a: Number of data blocks mapped by the file; excludes holes; relevant for thin files; maintained in write IO path; incremented for each write to a hole. | 340b: Number of indirect blocks allocated to support the file; maintained in write IO path; incremented for each indirect block mapped. |
| maxSize | 342a: Predetermined maximum file size in blocks; relevant for thick files; established at file creation. | 342b: Number of indirect blocks needed to support thick file at its maxSize (342a); calculated at file creation. |
| blocksAllocated-Uniquely | 344a: Lower bound on number of data blocks that are unique to this file; maintained in write IO path; incremented when writing to shared block or hole. | 344b: Lower bound on number of indirect blocks unique to file; maintained in write IO path; incremented when writing to shared indirect block or hole. |

The file system manager 150a increments the attributes 344a and 344b for blocksAllocatedUniquely each time a write is performed to a shared block or a hole in the file. For example, writing to a hole (i.e., a previously unmapped location) causes a new block to be allocated, which therefore is initially unique. Also, writing to a shared block induces a write split, which causes a new block to be allocated. The new block is unique and thus is counted by blocksAllocatedUniquely. In an example, however, it is assumed that the write split in response to writing the source file does not cause the block to become unique in the shared file (the file with which the block was shared), as it is likely that the shared block was also shared with multiple other files, such that the write split would not cause the block to become unique in the other files.

The inode 330 further includes one or more block pointers, which point either to data blocks or to indirect blocks in the file system address space 250. For example, block pointer 346 points to an IB (Indirect Block) 350. Each block pointer includes a shared attribute 346a, which indicates whether the block pointed-to by the block pointer 346 is shared or not, and an FSBN 346b of the pointed-to block. Here, FSBN 346b is the address of indirect block 350. A block pointer indicate a "hole" if its FSBN 346b is blank, null, or otherwise invalid.

IB 350 includes an array of block pointers (e.g., 356a, 356b, 356c, etc.), which may each be arranged identically to block pointer 346, for example. Each block pointer in the IB 350 may itself point to another IB or to a data block. IB's may thus be arranged in an IB tree 360, with leaf IBs of the IB tree 360 pointing to data blocks.

As further shown in FIG. 3, file system 150 includes version-family metadata for version family 310. Such version-family metadata includes blocksAllocated 320a for data (D) and blocksAllocated 320b for metadata (MD). The blocksAllocated 320a for data maintains a count of all data blocks allocated to all files in the version family 310. Likewise, the blocksAllocated 320b for metadata maintains a count of all indirect blocks (IB's) allocated to support all files in the version family 310. In an example, the metadata structures 320a and 320b are updated in an IO write path, with writes induced by IO requests 112 (FIG. 1) monitored to count each data block and indirect block allocated to the version family 310.

Figure 4:
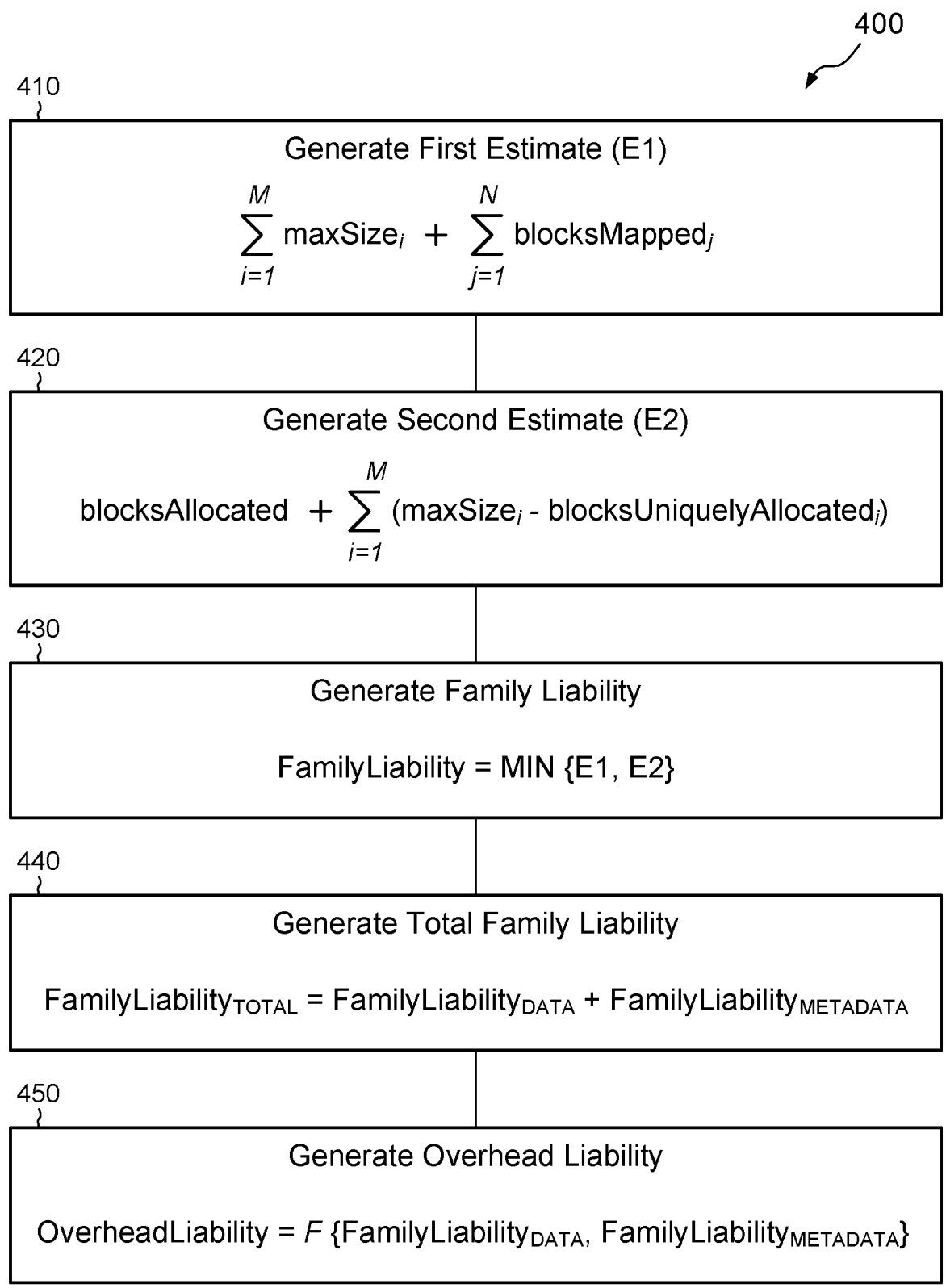
FIG. 4 is a flowchart of an example method for generating liability.

FIG. 4 shows an example method 400 for generating liability values in file system 150. The method 400 may typically be carried out by the file system manager 150a, which runs in the memory 130 of SP 120.

Acts 410 and 420 generate first and second estimates (E1 and E2) for family liability, i.e., liability of a single version family. These acts may be performed in any order, or simultaneously.

Generating the estimate E1 at 410 involves producing a summation of maxSize (Table 1) over all thick files (1 to M) in the version family. Act 410 also involves producing a summation of blocksMapped (Table 1) over all thin files (1 to N) in the version family. The first estimate E1 is then provided as the sum of these summations. It can be seen from act 410 that the estimate E1 generates liability to fully reserve all thick files as well as all blocks mapped in all thin files. Estimate E1 may be an overestimate, however, as it fails to account for any blocks that may be shared. It should be appreciated that values for maxSize and blocksMapped may be obtained from the inodes of the files in question (see FIG. 3).

Generating the second estimate E2 at 420 involves adding the total blocks allocated in the version family, blocksAllocated, to a summation, over all thick files (1 to M) of the difference between the maximum predetermined size, maxSize, of each thick file and the number of blocksAllocatedUniquely in that thick file. The summation in 420 thus corresponds to the total number of shared blocks and holes in all thick files in the version family. Adding this summation to blocksAllocated yields estimate E2, which is often less than estimate E1, although not necessarily in all cases. It should be noted that maxSize and blocksAllocatedUniquely may be obtained from the inodes of the files in question, whereas blockAllocated may be obtained from version family metadata 320a and/or 320b. With estimates E1 and E2 established, act 430 generates family liability as the minimum of E1 and E2.

In an example, the acts 410, 420, and 430 are performed once for file data and again for file metadata (e.g., indirect blocks). For example, the file system manager 150a may generate family liability for data using values of blocksAllocated (D) 320a, blocksMapped 340a, maxSize 342a, and blocksAllocatedUniquely 344a. Likewise, the file system manager 150a may generate family liability for metadata using values of blocksAllocated (MD) 320b, blocksMapped 340b, maxSize 342b, and blocksAllocatedUniquely 344b.

In some examples, as shown in act 440, total family liability is generated as the sum of family liability for data and family liability for metadata. In other examples, family liability for data and metadata are kept separate.

At 450, the file system generates overhead liability for overhead family OF. In an example, the file system manager 150a calculates overhead liability as a function of family liability for data and family liability for metadata.

With liability values for data, metadata, and overhead thus established, the file system manager 150a may provide their sum in a single insurance request 152, for which a single insurance reply 154 is received (FIG. 1). Alternatively, the file system manager 150a may provide separate insurance requests, one for data, one for metadata, and one for overhead, and receive respective insurance replies, or may provide insurance requests in any combination.

It should be appreciated that counting all shared blocks in all thick files, as is done by the summation for estimate E2, can help to reduce overestimates of liability, as it accounts for the fact that thick files may share blocks with one another and/or with thin files. Estimate E2 thus leverages block-sharing relationships among files within a version family, in a way that could not be achieved readily without arranging files in version families, as block-sharing relationships among files would be much more difficult to account for when estimating liability.

It should further be appreciated that estimate E2 reserves space for existing thin files (e.g., snaps) by counting all blocksAllocated in the version family. Thus, not only does estimate E2 insure that all thick files (any number of them) are fully reserved, but also that all snaps (and other thin files) are reserved, at least to the extent of their current sizes. With this arrangement, it should never be necessary to invalidate snaps to meet space guarantees of thick files, as the estimate E2 results in enough insurance to support the existing thin files.

Estimate E1 also avoids the need to invalidate snaps, as it counts all mapped blocks in thin files as well as the maximum sizes of all thick files. Thus, estimate E1 counts all blocks allocated to snaps, whether the snaps are thin or thick.

It may be noted that the mere act of creating a snap of a file will generally result in an increase in estimate E2. Taking a snap will cause all blocks in the file from which the snap is taken to become shared, thus reducing blocksAllocatedUniquely for that file to zero and increasing the overall estimate. In an example, liability is generated upon each lifecycle event of an object or snap, such that reserved space is kept current with version families as they evolve.

Section II: Tracking Version Families in a File System

Techniques will now be described for tracking version families in a file system. In an example, these techniques are performed by the data storage system 116 as described in connection with Section I. Details of the environment may vary, however, and the environment as described in Section I is intended to be illustrative rather than limiting.

As described in Section I, each version family (e.g., VF1, VF2, etc.; see FIG. 1) includes a respective set of files that are related based on snapping. For example, a version family may include one file, which implements a production data object, and other files, which implement snaps of that data object. In some examples, a version family may include snaps of other snaps. A consequence of these snap-based relationships is that the files within each version family may share blocks at corresponding file locations. For example, if a first file in a version family points to a particular data block at logical address 100, then each of the other files in that version family might also point to that data block at logical address 100. Indeed, only in the case of write splits or deletions will the files differ. Another consequence of snap-based relationships is that any two files in two different version families typically do not share blocks, as the two files are distinct. Any block sharing across version families is thus the result of some other process unrelated to snapping, such as deduplication.

Figures 5, 6:
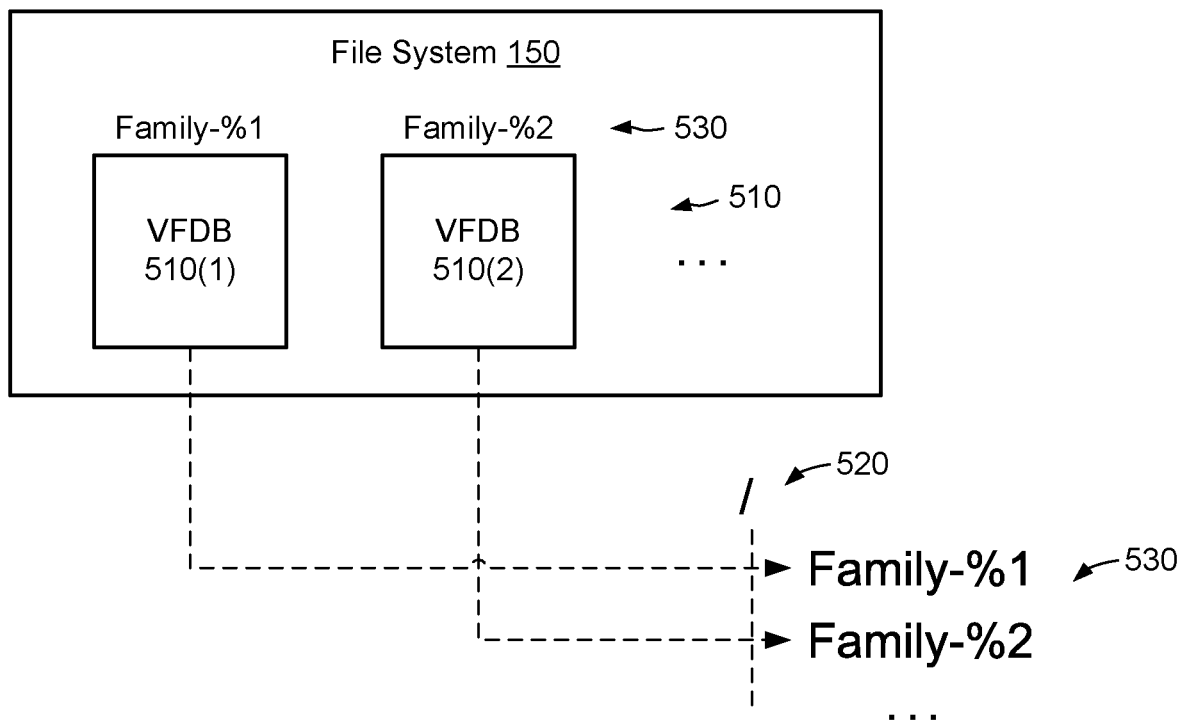
FIG. 5 is a block diagram of multiple example version family databases in a file system.
FIG. 6 is a block diagram of an example arrangement of a version family database.

FIG. 5 shows example additional features of file system 150 (FIG. 1). Here, file system 150 is seen to include multiple VFDBs (Version Family Databases) 510. The VFDBs 510 may take any suitable form, such as files, metadata structures, reserved file system subspaces, and the like. Two VFDBs are shown, including VFDB 510(1) for VF1 and VFDB 510(2) for VF2. One VFDB is provided for each version family in the file system 150, and the file system 150 may include any number of version families.

In a particular, non-limiting example, VFDBs are implemented in respective files, with each file having a respective file name accessible through a directory structure 520 of the file system 150. For example, the file system 150 provides VFDB 510(1) in a first file, having file name "Family-% 1," and provides VFDB 510(2) in a second file, having file name "Family-%2." In an example, the file system 150 stores these files in a common directory, such as in "root" or in some hidden directory. Thus, for example, a user might list the file names 530 by navigating the directory structure 520. In some examples, the file system 150 does not support multiple directories, but rather has a single space for files in a designated root location, where the VFDBs may be stored.

In some examples, the file names 530 are constructed in accordance with a naming convention and include an identifier of the version family for which the respective VFDBs are provided. Such version family identifiers, or "VFIDs," are preferably unique within file system 150. In the example shown, the "1" in "Family-%1" is the VFID of VF1. Likewise, the "2" in "Family-%2" is the VFID of VF2. Using this naming convention, the file system manager 150a can readily locate the VFDB for any version family simply by constructing its file name based on the VFID and performing a directory lookup in the directory designated for VFDBs. It should be appreciated that providing VFDBs in files and in accordance with the particular naming convention described is merely an example, as other ways of storing and locating VFDBs may be used.

FIG. 6 shows an example layout of information within a VFDB 510, which is intended to be representative of VFDBs 510(1) and 510(2). Here, it can be seen that the VFDB 510 includes multiple records. These include a record 0 (REC 0), which may also be referred to herein as a "header." The header stores information that is common to the version family as a whole, such as its VFID, for example. The records in VFDB 510 also include records 1 through 3, etc. (REC 1, REC 2, REC 3, etc.), which store information about respective files that belong to the version family for which VFDB 510 is provided. For example, REC 1 may store information pertaining to a first file in the version family, REC 2 may store information pertaining to a second file, and so forth. Such per-file information in a record may include, for example, an inode number and/or file name of the file being described by that record. In some examples, additional information is provided.

Figure 7:
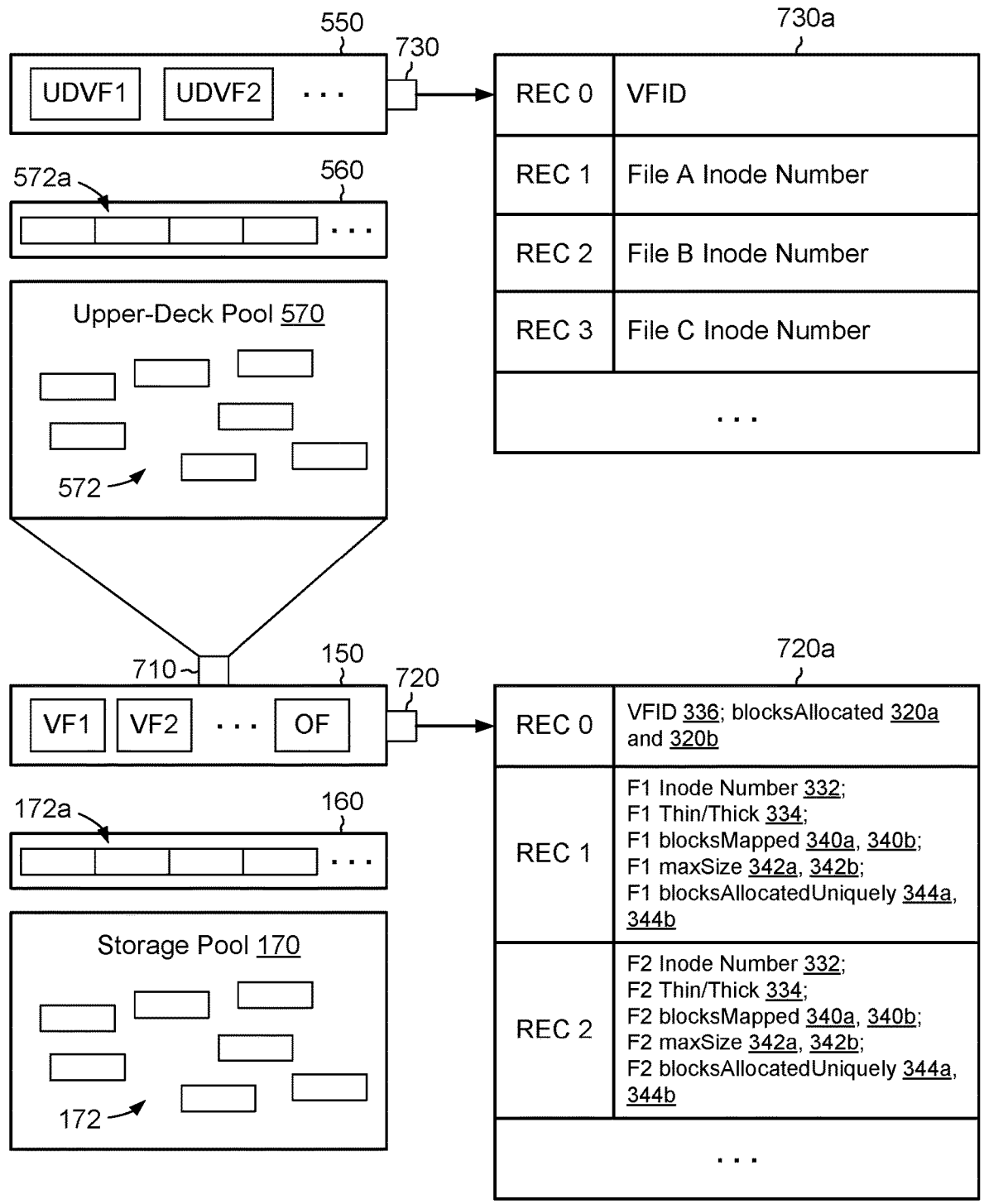
FIG. 7 is a block diagram of an example arrangement that includes version family databases in both an internal file system and a host-accessible file system.

FIG. 7 shows an example arrangement in which VFDBs are provided both for file system 150, which may be internal to the data storage system 116 in this example, and for a file system 550, which may be host accessible. For example, file system 150 may store a file 710, which implements the host-accessible file system 550. Within the data storage system 116, the file 710 is expressed as a collection of storage extents 572 in an upper-deck pool 570. An upper sparse volume 560 is built upon the upper-deck pool 570, and includes provisioned storage extents 572a. The host-accessible file system 550 is then built upon the sparse volume 560. It can be seen that the structures 550, 560, and 570, in the so-called "upper deck," are analogous to the structures 150, 160, and 170, already described, which may reside in a so-called "lower deck."

In accordance with embodiments hereof, the data storage system 116 may include VFDBs in the file system 150, in the file system 550, in both, or in any internal or host-accessible file system, regardless of its construction. In the example shown, the file system 150 includes a file 720 that stores a VFDB 720a, and the file system 550 includes a file 730 that stores a VFDB 730a. It should be appreciated, though, that each of the file systems 150 and 550 may include any number of files storing any number of VFDBs.

In the particular arrangement of FIG. 7, the VFDBs for the file system 550 (such as VFDB 730a) may support enumeration of files within respective version families. To support such enumeration, the VFDBs for file system 550 may assume a highly compact form, including the VFID in the header and, for each file record, the inode number within file system 550 of the respective file. In some example, even the VFID may be omitted, as it is implied from the file name of file 730.

In an example, the VFDBs for the file system 150 (such as VFDB 720a) may also support enumeration, as in the example above. Such lower-deck VFDBs may further support liability estimations on a per-family basis (see Section I) and fast failover scenarios. As will be described, fast failover scenarios involve instantiating and populating software objects for managing files and/or version families quickly on a second storage processor (e.g., SP 120a) upon a failure of a first storage processor (e.g., SP 120).

The VFDBs in the file system 150 preferably include additional information to support these additional operations. For example, the header (REC 0) in VFDB 720a may include not only a VFID 336 (FIG. 3), but also the family's blocksAllocated counters 320a and 320b (Table 1). Also, the per-file records (REC 1, REC 2, etc.) may include, for each file, not only the inode number 332 of the file in file system 150, but also the Thin/Thick attribute 334, the maxSize attributes 342a and 342b (Table 1), and the counters 340a and 340b for blocksMapped and 344a and 344b for blocksUniquelyAllocated (Table 1). Of course, variants may be constructed that include fewer or different attributes and/or counter values. The ones illustrated are particularly helpful, however, in estimating family liability and in supporting fast failover, as the VFDB 720a includes essentially all the relevant information needed for performing these operations. Thus, for example, rather than having to access the inode 330 of each member file in the version family, which could be a costly activity as there may be hundreds of files, all that is necessary is to access the one VFDB 720a. The VFDB 720a therefore promotes file system efficiency by aggregating, in a single metadata structure that occupies a relatively small amount of space, information that otherwise might be widely dispersed within the file system 150 in blocks that collectively occupy a great deal more space. The VFDB 710a thus enables the file system manager 150a to perform its operations efficiently, with fewer disk accesses, less seeking, less disk drive (or SSD) wear, and in less time than would be required otherwise.

In an example, values of counters shown in VFDB 720a are maintained transactionally, in a write IO path of the data storage system 116. For example, each time the file system manager 150a performs an allocating write to any file in a version family, the file system manager 150a updates the affected counters in both the inode of the file being written and in the VFDB of that file's version family. In this manner, the counters in the VFDB are kept in sync with the counters in the inodes of its member files. As used herein, the term "allocating write" refers to any write to a file that entails allocating a new block. These include, for example, writes to holes and writes to shared blocks that entail write splits.

Although the arrangement of FIG. 7 shows the file system 150 in a lower-deck configuration, it should be appreciated that some embodiments may not involve any upper-deck file system at all. For example, version families in the file system 150 may include files that implement LUNs, VVols, and/or other data objects, which are not expressed as upper-deck file systems. Such embodiments may benefit from the same VFDB 720a as shown. In addition, the compact form of the VFDB 730a should not be regarded as limiting, as the file system 550 may itself support additional use cases, such as generating liability and supporting fast failover, and may thus benefit from including some or all of the additional content shown in VFDB 720a. The particulars of FIG. 7 are therefore merely illustrative.

FIGS. 8-13 show various methods that may be carried out in the environment 100 of FIG. 1. The acts described in FIGS. 8-13 may be performed by the file system manager 150a running on the storage processor 120 and/or on the storage processor 120a, and may be directed to operations on the file system 150 and/or the file system 550, with the descriptions below directed to file system 150 for brevity. Embodiments may be constructed in which acts are performed in orders different from those illustrated, which may include performing some acts simultaneously.

Figure 8:
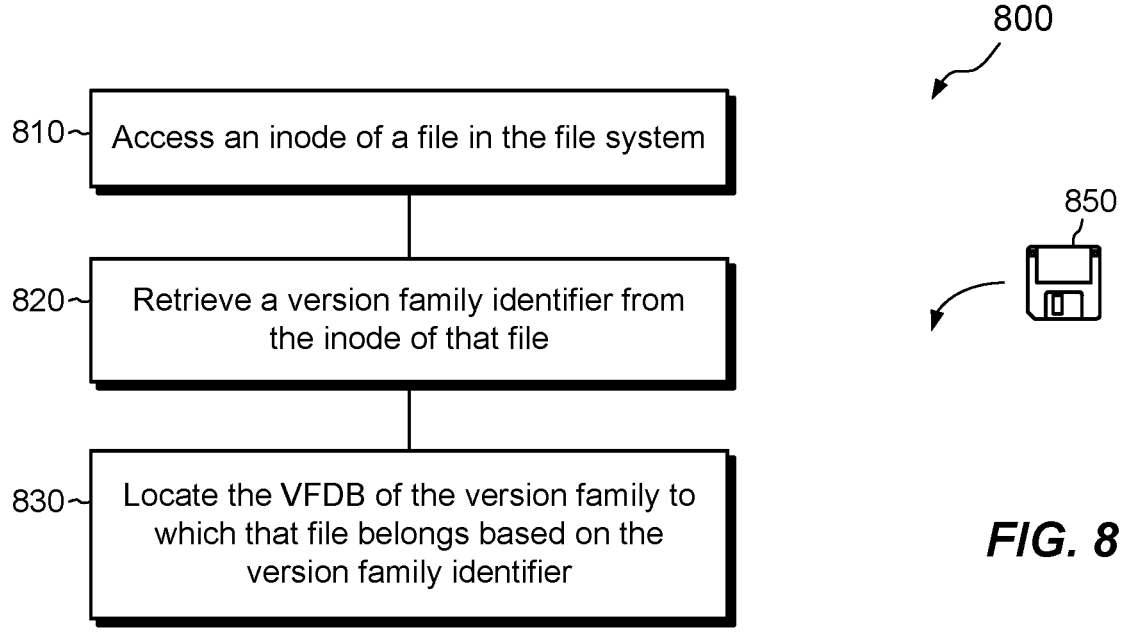
FIG. 8 is a flowchart showing an example method of locating a VFDB given a file that belongs to the version family for which the VFDB is provided.

FIG. 8 shows an example method 800 for locating a VFDB in a file system based on information about a file that belongs to the corresponding version family. At 810, the file system manager 150a accesses a file in the file system 150, such as the file F2 (see FIG. 3).

At 820, the file system manager 150a retrieves a version family identifier (VFID 336) from the inode (330) of the file (F2). In an example, the VFID is a number that uniquely identifies the version family to which the file (F2) belongs.

At 830, the file system manager 150 locates the VFDB of the version family identified by the retrieved VFID based on that VFID. For example, the file system manager 150a applies the above-described naming convention to generate a file name in the form "Family-%<V FID>." The file system manager 150a then performs a directory lookup in a directory specified for storing VFDBs in the file system 150, such as in some hidden directory. In a lower-deck file system arrangement, the entire file system may be hidden from users, such that the "hidden" directory may be any directory, including root. In an upper-deck or other arrangement, the hidden directory may be a particular directory that the file system defines as hidden.

Other arrangements may be employed for locating VFDBs, and the invention hereof is not limited to any particular approach. For example, in an alternative arrangement, the file system manager 150a may specify the VFID (336) as the inode number of the file containing the VFDB for the respective version family.

Figure 9:
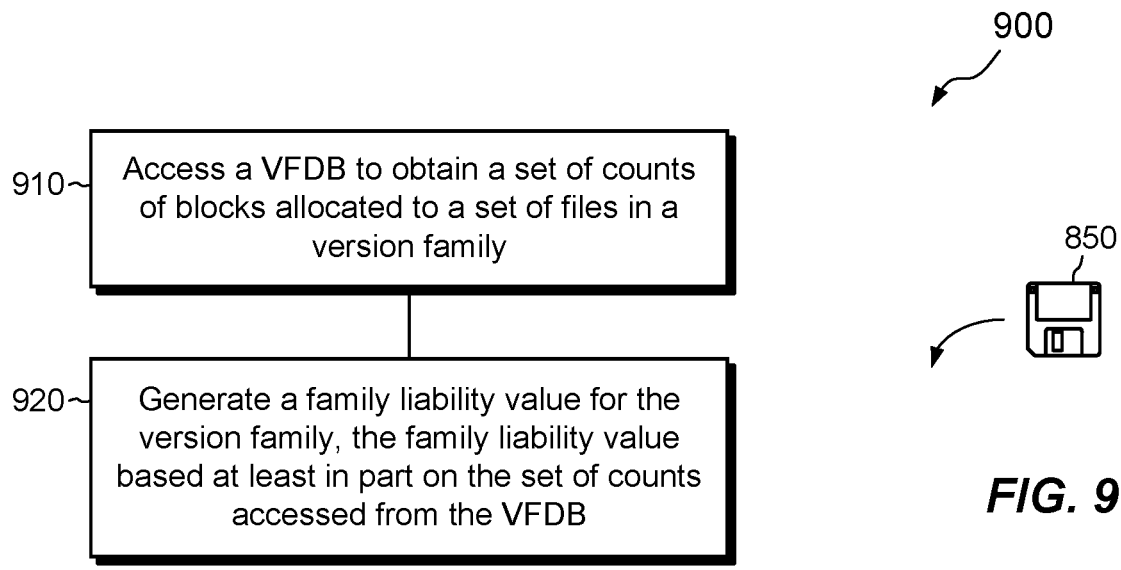
FIG. 9 is a flowchart showing an example method of generating a family liability value using a VFDB.

FIG. 9 shows an example method 900 for generating a family liability value using a VFDB. Examples of generating family liability values are described in Section I and are not repeated here. It should be appreciated, however, that embodiments hereof are not limited to the particular details for generating liability as described in Section I.

At 910, a VFDB is accessed to obtain a set of counts of blocks allocated to a set of files in a version family. For example, the file system manager 150a may start with a VFID and look up the corresponding VFDB, using portions of the method 800 described above. The file system manager 150a may then access any of the counters in that VFDB, such as those shown in VFDB 720a (FIG. 7). These include, for example, either or both blocksAllocated counters 320a and 320b for the version family as a whole, either or both blocksMapped counters 340a and 340b for each member file, and/or either or both blocksAllocatedUniquely counters 344a and 344b for each member file.

At 920, the file system manager 150a generates a family liability value for the version family based at least in part on the counter value or values obtained at 910. It should be appreciated that generating liability values in this example does not require accessing the inode of each member file in the version family, or even of any member file. Rather, liability values may be generated solely by accessing the VFDB for the version family.

Figure 10:
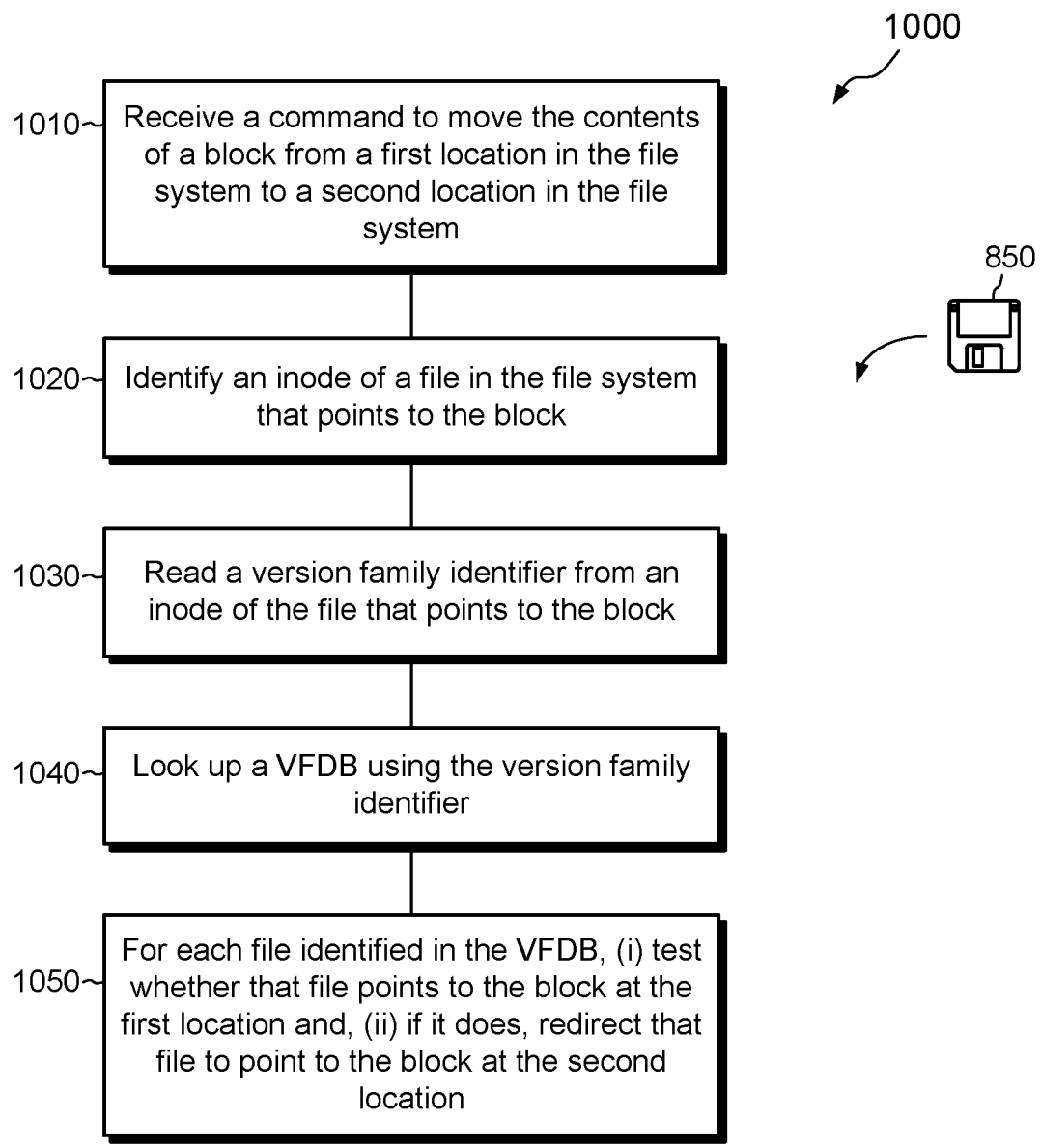
FIG. 10 is a flowchart showing an example method of relocating a block of a file that belongs to a version family using a VFDB for that version family.

FIG. 10 shows an example method 1000 for using a VFDB to facilitate file system processing when moving contents of one or more blocks. Moving contents of blocks is a common task performed by many file systems. In an example, the file system manager 150a may attempt to evacuate a range of contiguous blocks in the address space 250 (FIG. 2), e.g., to accommodate writes of sequential data, to return unused provisioned extents 172a to the pool 170, and/or for any other reason.

To create free space, the file system manager 150a may step through each block location (FSBN) in a specified range. For each allocated block that it finds, the file system manager 150a moves the contents of the block to a different location, i.e., outside the range being evacuated. However, moving contents of blocks may be a complex task in a file system that allows block sharing.

Given this context merely as an example, the process 1000 begins at 1010, where a command is received to move the contents of a block from a first location in the file system to a second location in the file system. For example, the command may specify moving the contents of a block within a range to be evacuated to a block in a different range of the file system 150.

At 1020, the file system manager 150a identifies an inode of a file in the file system that points to the block whose contents are to be moved. In an example, the file system 150 includes per-block metadata (not shown). Such per-block metadata are stored at locations that are readily ascertained based on the address of the blocks to which the per-block metadata pertains (e.g., their FSBNs). The per-block metadata may include, inter alia, the inode number of the file that allocated that block and the logical address into the file where the block was allocated. The file system manager 150a may then identify the inode of a file that points to the block based on the inode number found in the per-block metadata. Also, the file system manager 150a may temporarily hold the logical address from the per-block metadata for later use.

At 1030 and 1040, the file system manager 150a reads a VFID 336 from the identified inode and accesses the corresponding VFDB of the version family identified by the VFID 336. For example, the file system manager 150a may employ the process 800 described in FIG. 8.

At 1050, the file system manager 150a checks each file identified in the VFDB. For example, for each file listed in the VFDB, the file system manager 150a (i) tests whether that file points to the first location and, (ii) if it does, redirects that file to point to the second location. For example, the file system manager 150a applies the logical address from the per-block metadata and does a lookup into each file at the specified logical address. If the block pointer at the specified logical address points to the first location (FSBN), then the file system manager 150a redirects that file by changing the block pointer to instead point to the second location. These actions are repeated for each file listed in the VFDB.

It should be appreciated that the VFDB greatly facilitates file system operations when moving blocks by greatly narrowing the scope of files that need to be checked for block-sharing relationships. For example, rather than having to check every single file in the file system 150 for block sharing, the file system manager 150 instead only checks the files identified in the VFDB, as only those files might share blocks induced by file snapping.

Figure 11:
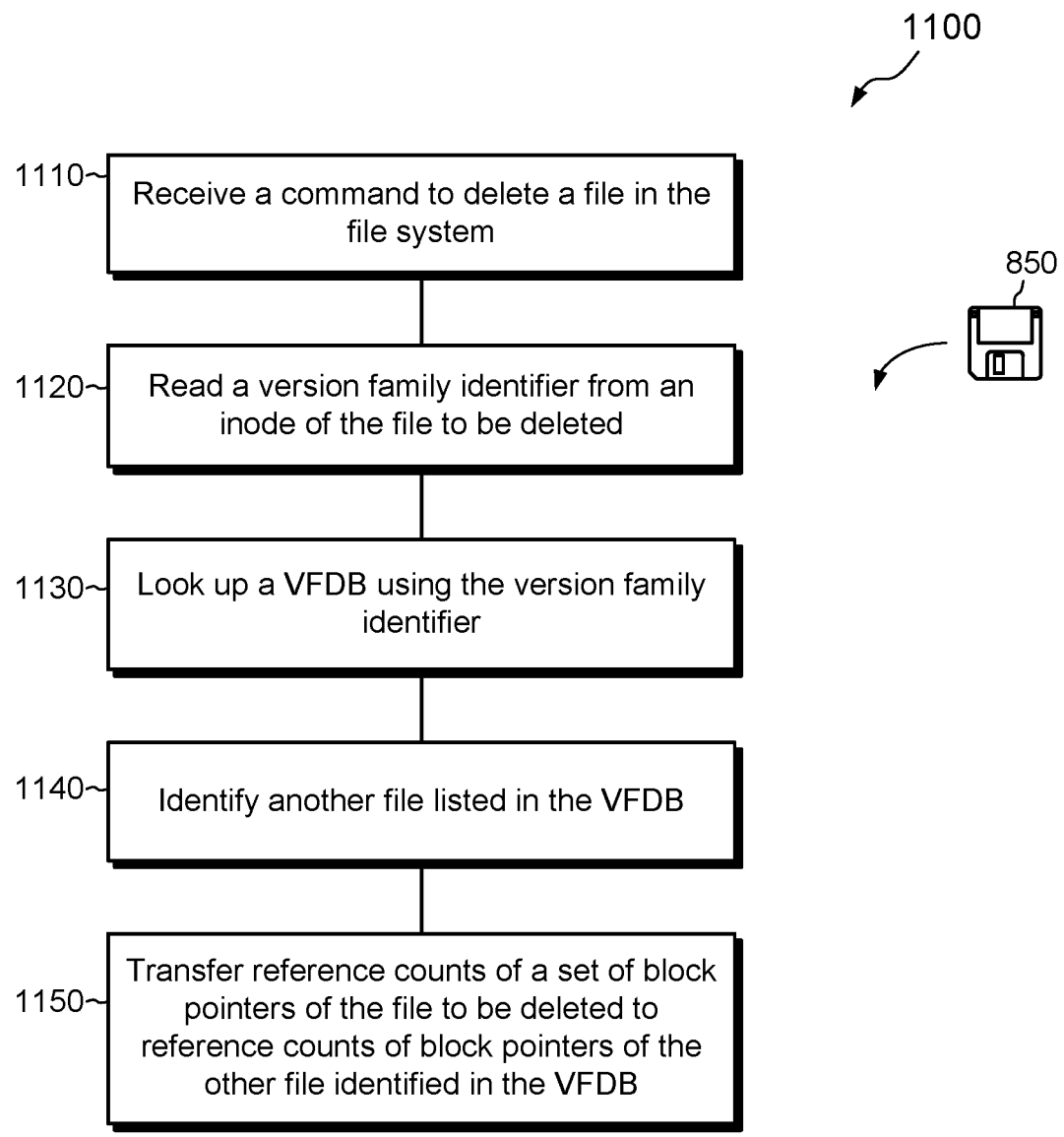
FIG. 11 is a flowchart showing an example method of handling reference counts when deleting a file that belongs to a version family using a VFDB for that version family.

FIG. 11 shows an example method 1100 for transferring reference counts when deleting files. In an example, each block pointer in the IB tree 360 of each file in the file system 150 includes a reference count (not shown). When a file that belongs to a version family is deleted, the reference counts previously held by that file must be accounted for, either by returning the reference counts to the per-block metadata (described above) of the pointed-to block or by returning the reference counts to block pointers of another file that shares the block at the same logical address. For performance-related reasons, returning the reference counts to another file that shares the block is generally preferable to returning them to the per-block metadata, as it involves fewer disk accesses when performed over many blocks. The method 1100 greatly facilities returning reference counts to another file, as the VFDB includes only those files in the file system 150 that potentially share blocks at corresponding logical addresses, based on file snapping.

The process 1100 begins at 1110, where a command is received to delete a file in the file system. Acts 1120 and 1130 serve to locate the VFDB for the file to be deleted, and are similar to the acts described in method 800.

At 1140, the file system manager 150*a* identifies another file listed in the VFDB, i.e., a file other than the file to be deleted. In a non-limiting example, the identified file is a file generated immediately before the file to be deleted, which may by represented by the previous record.

At 1150, the file system manager 150*a* transfers at least some of the reference counts of block pointers in the file to be deleted to reference counts of corresponding block pointers of the other file. For example, for each block pointer of the file to be deleted, the file system manager looks up the corresponding block pointer in the other file. If both block pointers point to the same block, the file system manager 150*a* adds the reference weight from the block pointer of the file to be deleted to the corresponding reference weight of the other file. This operation is repeated for every block in the file to be deleted. For blocks of the file to be deleted that are not shared with the other file, reference weights may be returned to the per-block metadata instead of to the block pointer of the other file.

Although not specifically shown, the file system manager 150*a* may also delete the record for the file to be deleted from the VFDB. In general, the file system manager 150*a* keeps each VFDB current with the files in the file system 150. For example, each time a new file is created (e.g., a snap) that belongs to a version family, the file system manager 150*a* updates the corresponding VFDB to include a new record for the new file. Likewise, each time a file in a version family is deleted, the file system manager 150*a* removes the record for that file from the corresponding VFDB. Thus, the status of records in the VFDBs tracks the status of corresponding files in the file system 150.

FIG. 12 shows an example method 1200 for performing fast failover in the data storage system 116. At 1210, a first storage processor, e.g., SP 120, provides host access to files in a version family, e.g., by providing access to the data objects implemented by those files. Providing host access involves running a set of software objects in memory 130 of SP 120. Such software objects may represent files in the version family and/or the version family itself, and may include properties that correspond to values stored in the VFDB for that version family.

At 1220, upon failure of SP 120, operation may failover to SP 120*a*. Failover may involve instantiating the set of software objects on SP 120*a*, e.g., the software objects that previously ran on SP 120, and populating those objects with property values. Here, rather than accessing the inodes of each file in a version family to obtain the needed property values, the method 1200 instead accesses the VFDB for that version family. The method 1200 may then populate the properties of the set of software objects, now running on SP 120*a*, with the values obtained from the VFDB.

At 1230, the second SP 120*a* provides host access to the files of the version family, in place of SP 120. Because the VFDB enables the SP 120*a* to populate the set of software objects quickly, e.g., by accessing only a single VFDB for an entire version family and all of its files, the SP 120*a* is able to resume hosting operations much more quickly than it would if it had to reach into the inode of each file in the version family to obtain the same information.

FIG. 13 shows an example method 1300 for facilitating file system operations in a data storage system. At 1310, a file system manager (e.g., 150*a*) stores a VFDB (Version Family Database) 510 for each of multiple version families (e.g., VF1, VF2, etc.) in a file system 150 (or 550) of the data storage system 116. Each VFDB 510 includes information pertaining to a respective version family, and each version family includes a respective set of files in the file system that are related to one another by file snapping.

At 1320, upon creation of a snap of a file that belongs to one of the version families, an identifier of the snap (e.g., the inode number 332 of the snap) is stored together with an identifier of the file (e.g., an inode number 332 of the file) in a VFDB 510 of the version family to which the file belongs.

An improved technique has been described for facilitating file system operations in a data storage system 116. The improved technique provides multiple version family databases 510, where each version family database identifies members of a respective version family, i.e., a respective set of files in a file system 150 (or 550) that are related by file snapping. When a snap of a file is created, the file system updates a version family database 510 for the version family that includes the file, such that the version family database identifies both the file and the snap.

In the manner described, version family databases provide structures that a file system may access to identify, easily and efficiently, only those files that are related by file snapping and thus only those files that are candidates for data sharing at corresponding file locations. Version family databases thereby allow file system operations to proceed efficiently, even if a file system includes many production data objects and their respective snaps.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 850 in FIGS. 8-13). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of facilitating file system operations in a data storage system, the method comprising:
   storing a VFDB (version family database) for each of multiple version families in a file system of the data storage system, each VFDB including information pertaining to a respective version family, each version family including a respective set of files in the file system that are related to one another by file snapping; and
   upon creation of a snap of a file that belongs to one of the version families, storing an identifier of the snap together with an identifier of the file in a VFDB of the version family to which the file belongs,
   wherein storing the VFDB for each version family includes storing a list of identifiers of all files that belong to that version family, wherein storing the VFDB for each of the version families includes (i) storing a first record in the VFDB, the first record including information pertaining to the respective version family as a whole and (ii) storing an additional record in the VFDB for each file that belongs to that version family, and
   wherein the method further comprises:
      receiving a command to delete a file in the file system;
      reading a version family identifier from an inode of the file to be deleted;
      looking up a VFDB using the version family identifier;
      identifying another file listed in the VFDB; and
      transferring reference counts of a set of block pointers of the file to be deleted to reference counts of block pointers of the other file identified in the VFDB.

2. The method of claim 1, wherein the file system provides an inode for each file in the file system that belongs to a version family, and wherein the method further comprises storing a version family identifier in the inode of each such file, the version family identifier identifying the version family to which the respective file belongs.

3. The method of claim 2, wherein the method further comprises:
   accessing an inode of a file in the file system;
   retrieving a version family identifier from the inode of that file; and
   locating the VFDB of the version family to which that file belongs based on the version family identifier.

4. The method of claim 3, wherein each VFDB is stored in a respective file in the file system, and wherein locating the VFDB includes:
   generating a file name based on the version family identifier; and
   performing a directory lookup for the file name in the file system.

5. The method of claim 1, wherein storing the VFDB for a version family includes storing a set of counts of blocks allocated to the set of files in that version family, and wherein the method further comprises:
   accessing the VFDB to obtain the set of counts; and
   generating a family liability value for the version family, the family liability value based at least in part on the set of counts accessed from the VFDB.

6. The method of claim 5, wherein storing the first record in the VFDB includes storing a count of blocks allocated to all files in the version family, wherein generating the family liability value for the version family is based at least in part on the count of blocks allocated to all files in the version family.

7. The method of claim 1, further comprising:
   receiving a command to move contents of a block from a first location in the file system to a second location in the file system;
   identifying an inode of a file in the file system that points to the block;
   reading a version family identifier from the inode of the file that points to the block;
   looking up a VFDB using the version family identifier; and
   for each file identified in the VFDB, (i) testing whether that file points to the block at the first location and, (ii) if it does, redirecting that file to point to the block at the second location.

8. The method of claim 1, wherein the data storage system includes a first storage processor and a second storage processor, wherein a VFDB for a version family is accessible by both the first storage processor and the second storage processor, and wherein the method further comprises:
   providing host access to files of a version family by a set of software objects running on the first storage processor;
   upon a failure of the first storage processor, populating the set of software objects on the second storage processor by (i) accessing information about each file in the version family from the VFDB and (ii) providing the accessed information to the set of software objects on the second storage processor; and providing host access to the files of the version family by the set of software objects running on the second storage processor.

9. The method of claim 1, further comprising, in response to the data storage system receiving an IO (input/output) request that specifies an allocating write to a file in a version family:
updating at least one counter of allocated blocks in an inode of the file; and
updating at least one counter of allocated blocks in a VFDB of the version family.

10. The method of claim 9, wherein updating at least one counter of allocated blocks in the VFDB includes:
updating a count of blocks in the first record of the VFDB, the count of blocks in the first record of the VFSB counting blocks allocated to all files in the version family; and
updating a count of blocks in an additional record of the VFDB, the count of blocks in the additional record of the VFSB counting blocks allocated to the file.

11. The method of claim 1, wherein storing the VFDB for a version family includes storing a set of counts of blocks allocated to the set of files in that version family, and wherein the method further comprises:
accessing the VFDB to obtain the set of counts;
generating a family liability value for the version family, the family liability value based at least in part on the set of counts accessed from the VFDB; and
obtaining insurance to cover the family liability value for the version family from a storage pool.

12. A computer program product including a set of non-transitory, computer-readable media having instructions which, when executed by control circuitry of a data storage system, cause the control circuitry to perform a method for managing storage space in a data storage system, the method comprising:
storing a VFDB (version family database) for each of multiple version families in a file system of the data storage system, each VFDB including information pertaining to a respective version family, each version family including a respective set of files in the file system that are related to one another by file snapping; and
upon creation of a snap of a file that belongs to one of the version families, storing an identifier of the snap together with an identifier of the file in a VFDB of the version family to which the file belongs,
wherein storing the VFDB for each version family includes (i) storing a list of identifiers of all files that belong to that version family, (ii) storing a first record in the VFDB, the first record including information pertaining to the respective version family as a whole and (iii) storing an additional record in the VFDB for each file that belongs to that version family,
wherein the file system provides an inode for each file in the file system that belongs to a version family, wherein the method further comprises storing a version family identifier in the inode of each such file, the version family identifier identifying the version family to which the respective file belongs; and
wherein storing the VFDB for a version family includes storing a set of counts of blocks allocated to the set of files in that version family, and wherein the method further comprises:
accessing the VFDB to obtain the set of counts; and
generating a family liability value for the version family, the family liability value based at least in part on the set of counts accessed from the VFDB.

13. The computer program product of claim 12, wherein each VFDB is stored in a respective file in the file system, and wherein the method further comprises:
accessing an inode of a file in the file system;
retrieving a version family identifier from the inode of that file; and
locating the VFDB of the version family to which that file belongs based on the version family identifier,
wherein locating the VFDB includes generating a file name based on the version family identifier and performing a directory lookup for the file name in the file system.

14. The computer program product of claim 12, wherein the method further comprises:
receiving a command to move contents of a block from a first location in the file system to a second location in the file system;
identifying an inode of a file in the file system that points to the block;
reading a version family identifier from the inode of the file that points to the block;
looking up a VFDB using the version family identifier; and
for each file identified in the VFDB, (i) testing whether that file points to the block at the first location and, (ii) if it does, redirecting that file to point to the block at the second location.

15. A computer program product including a set of non-transitory, computer-readable media having instructions which, when executed by control circuitry of a data storage system, cause the control circuitry to perform a method for managing storage space in a data storage system, the method comprising:
storing a VFDB (version family database) for each of multiple version families in a file system of the data storage system, each VFDB including information pertaining to a respective version family, each version family including a respective set of files in the file system that are related to one another by file snapping; and
upon creation of a snap of a file that belongs to one of the version families, storing an identifier of the snap together with an identifier of the file in a VFDB of the version family to which the file belongs,
wherein storing the VFDB for each version family includes (i) storing a list of identifiers of all files that belong to that version family, (ii) storing a first record in the VFDB, the first record including information pertaining to the respective version family as a whole and (iii) storing an additional record in the VFDB for each file that belongs to that version family,
wherein the file system provides an inode for each file in the file system that belongs to a version family, wherein the method further comprises storing a version family identifier in the inode of each such file, the version family identifier identifying the version family to which the respective file belongs; and
wherein the method further comprises, in response to the data storage system receiving an IO (input/output) request that specifies an allocating write to a file in a version family:
updating at least one counter of allocated blocks in an inode of the file; and updating at least one counter of allocated blocks in a VFDB of the version family.

* * * * *